United States Patent [19]

Ohkumo

[11] Patent Number: 4,823,555
[45] Date of Patent: Apr. 25, 1989

[54] SYSTEM FOR CONTROLLING A COMPRESSOR OF AN AIR CONDITIONER FOR MOTOR VEHICLES

[75] Inventor: Hiroya Ohkumo, Koganei, Japan

[73] Assignee: Fuji Jukogyo Kabushiki Kaisha, Tokyo, Japan

[21] Appl. No.: 135,584

[22] Filed: Dec. 21, 1987

[30] Foreign Application Priority Data

Dec. 26, 1986 [JP] Japan .................. 61-312964

[51] Int. Cl.⁴ .............................. B60H 1/32
[52] U.S. Cl. ......................... 62/133; 62/243; 62/323.4
[58] Field of Search ............... 62/133, 230, 243, 323.1, 62/323.4

[56] References Cited

U.S. PATENT DOCUMENTS

| | | | |
|---|---|---|---|
| 4,135,368 | 1/1979 | Mohr et al. | 62/133 |
| 4,269,033 | 5/1981 | Birch | 62/133 |
| 4,355,523 | 10/1982 | Shimada | 62/133 |
| 4,658,943 | 4/1987 | Noshikawa et al. | 62/133 X |
| 4,688,530 | 8/1987 | Nishikawa et al. | 62/133 X |

FOREIGN PATENT DOCUMENTS

| | | | |
|---|---|---|---|
| 49-102029 | 9/1974 | Japan . | |
| 52-99530 | 8/1977 | Japan . | |
| 0033514 | 2/1983 | Japan | 62/133 |

Primary Examiner—Harry B. Tanner
Attorney, Agent, or Firm—Martin A. Farber

[57] ABSTRACT

A vehicle speed detector is provided for producing a vehicle speed signal and a load detector detects load on an engine to produce a load signal. A map storing a plurality of reference load values dependent on vehicle speeds is provided, and a reference load value is derived from the map in accordance with the vehicle speed signal. The load signal is compared with a derived reference load value. When the load is larger than the derived reference load value, a clutch for a compressor is disengaged to stop operation of the compressor.

2 Claims, 3 Drawing Sheets

SYSTEM FOR CONTROLLING A COMPRESSOR OF AN AIR CONDITIONER FOR MOTOR VEHICLES

BACKGROUND OF THE INVENTION

The present invention relates to a system for controlling the operation of a compressor of an air conditioner for motor vehicles, and more particularly to a system for stopping the operation of the compressor in particular driving conditions of the vehicle.

Heretofore, the operation of the compressor is stopped, in order to reduce the load on the engine when large driving power is required at particular driving conditions such as acceleration of the vehicle.

As examples, Japanese Patent Application Laid Open No. 49-102029 discloses a system which operates to stop the operation of a compressor when an accelerator pedal of a motor vehicle is depressed over a predetermined degree, and Japanese Patent Application Laid Open No. 52-99530 discloses a system for cutting off the power transmitted to a compressor when pressure in an intake passage exceeds a predetermined value.

In the prior art, the condition, such as the pressure in the intake passage, for removing the compressor load on the engine is set to a single reference value, regardless of driving conditions of the vehicle. Accordingly, sufficient driveability of the vehicle can not be effected in the air conditioning state, particularly at acceleration after starting the vehicle.

SUMMARY OF THE INVENTION

The object of the present invention is to provide a control system which may improve the driveability of the vehicle at low vehicle speed and increase the air conditioning performance in a middle and high vehicle speed range.

The other objects and features of this invention will become understood from the following description with reference to the accompanying drawings.

DETAILED DESCRIPTION OF THE PREFERRED EMBODIMENT

Figure 1:
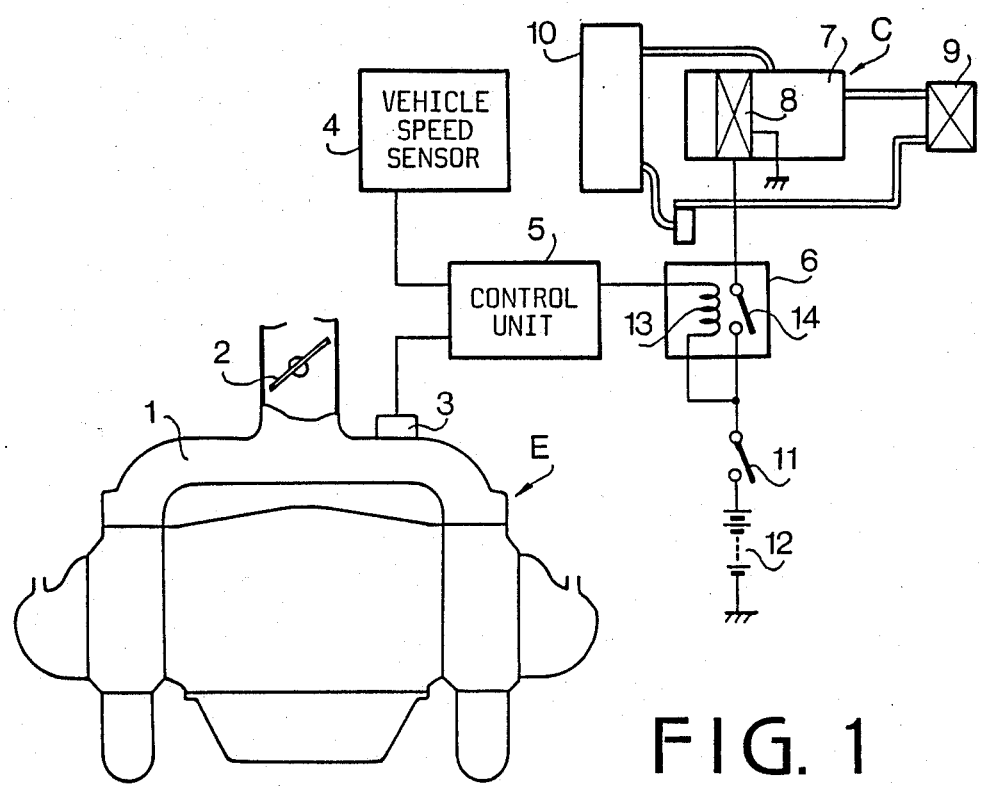
FIG. 1 is a schematic illustration showing an air-conditioning system.

Referring to FIG. 1, an automotive engine E mounted on a vehicle has an intake manifold 1, a throttle valve 2 provided in the intake manifold 1 and a pressure sensor 3 for detecting the pressure in the intake manifold 1. The vehicle has a vehicle speed sensor 4 and a control unit 5 which is supplied with output signals of the pressure sensor 3 and vehicle speed sensor 4. An air conditioner C comprises a compressor 7, an electromagnetic clutch 8 for coupling an output shaft of the engine with the compressor 7, an evaporator 9, a condenser 10, and relay 6 for energizing the clutch 8. A coil 13 and a relay switch 14 of the relay 6 are connected to a battery 12 through an air conditioner switch 11.

Figure 2:
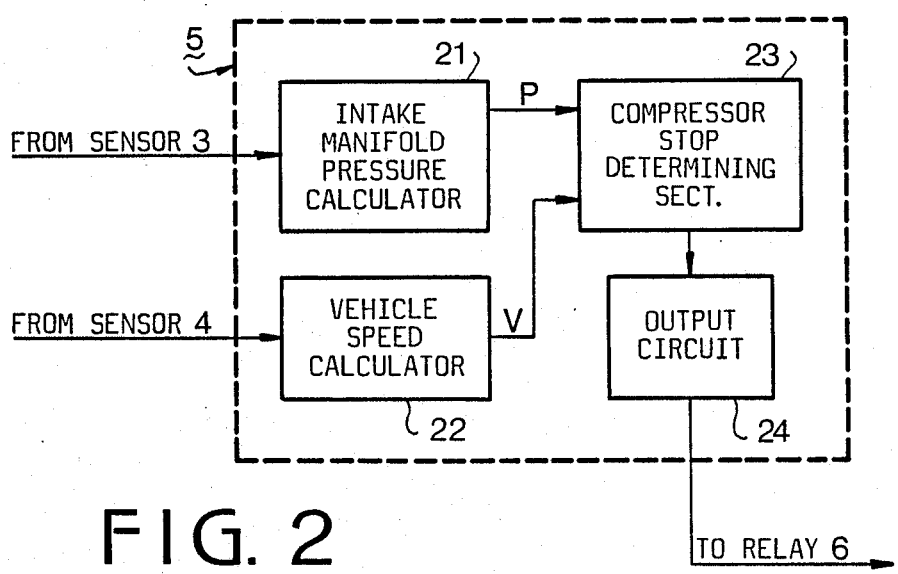
FIG. 2 is a block diagram showing a control system according to the present invention.

Referring to FIG. 2 showing the control unit 5, the output signal of the pressure sensor 3 is supplied to an intake manifold pressure calculator 21 and the output signal of the vehicle speed sensor 4 is applied to a vehicle speed calculator 22 for calculating vehicle speed. An intake pressure signal P and a vehicle speed signal V are applied to a compressor stop determining section 23. The section 23 produces a clutch disengagement signal under predetermined conditions as described hereinafter. The clutch disengagement signal is applied to an output circuit 24 which operates to open the circuit of the coil 13 to de-energize the coil, thereby opening the relay switch 14 to disengage the clutch 8.

Figure 3:
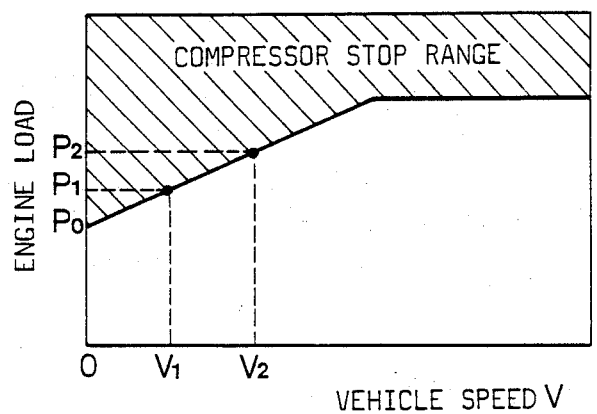
FIG. 3 shows a map for determing compressor stop conditions.

FIG. 3 shows a map in which a compressor stop range (disengagement of the clutch 8) is shown. The disengagement of the clutch 8 is determined by the intake manifold pressure P, which corresponds to engine load, and vehicle speed V. The intake manifold pressure P determining stopping of the compressor reduces as the vehicle speed reduces.

Figure 5:
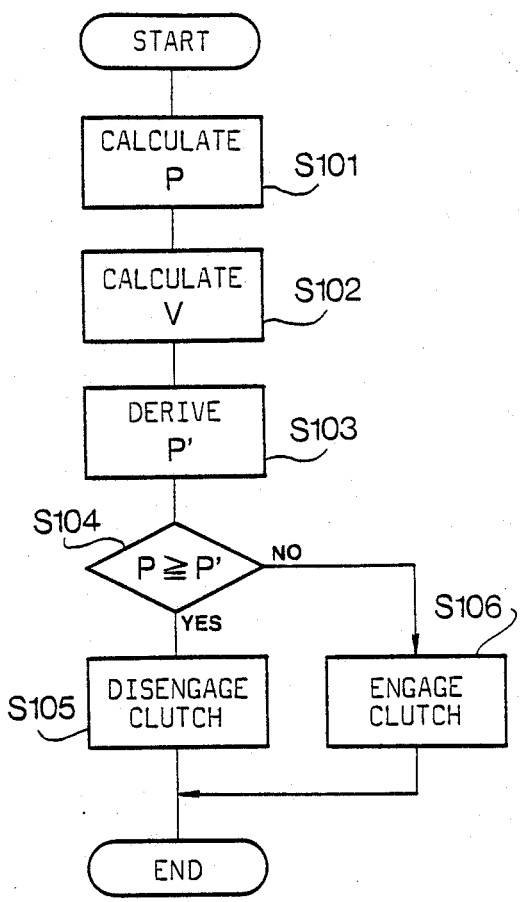
FIG. 5 is a flowchart showing the operation of the control system.

Referring to FIG. 5 showing the operation of the system, the intake manifold pressure P is calculated based on the output signal of the pressure sensor 3 at a stop S101, and the vehicle speed V is calculated at a step S102 from the output of the vehicle speed sensor 4. Thereafter, a reference pressure P' is derived from the map of FIG. 3 at a step S103 in accordance with the vehicle speed V. The intake manifold pressure P is compared with the reference pressure P' at a step S104. If the pressure P is higher than the reference pressure P', which means the load on the engine is larger than a reference value, the program proceeds to a step S105. At the step S105, the control unit 5 produces a clutch disengagement signal, so that the switch 14 opens to disengage the clutch 8. Thus, the compressor stops, thereby reducing the load on the engine to increase the power for driving the vehicle. When the pressure P becomes lower than the reference pressure P', the clutch is engaged at a step S106. As another embodiment, the control unit 5 may be arranged to hold the clutch disengagement signal for a predetermined period, thereby engaging the clutch after the period of disengagement of the clutch.

Figure 4:
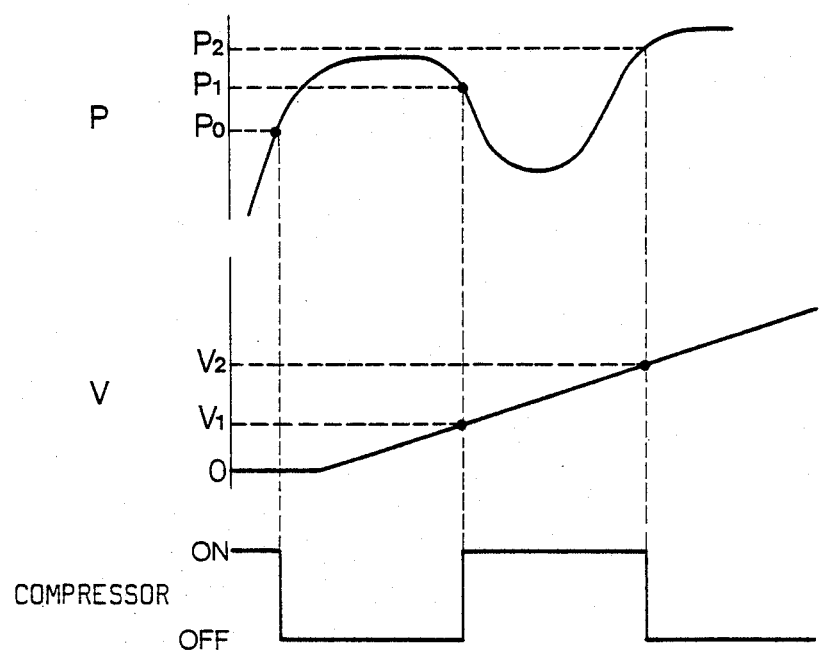
FIG. 4 is a graph showing an example of the operation of the control system of the present invention.

Referring to FIG. 3 and FIG. 4 showing, an example of the operation, at the start of the vehicle, the intake manifold pressure P is higher than a reference pressure Po, since the reference pressure is set to a low value. Accordingly, the clutch 8 is disengaged so that the compressor 7 is off. At vehicle speed V1, when the pressure P reduces below a reference pressure P1, the compressor is operated. If the pressure P rises above a reference pressure P2 at vehicle speed V2, the compressor stops.

It is preferable to provide a hysteresis between on and off of the compressor by setting an off-reference pressure to a higher load value than an on-reference pressure, at the same vehicle speed. Further the engine load may be detected by throttle position or by other parameters proportional to the intake manifold pressure or the throttle position.

Thus, in accordance with the present invention, the driveability of the vehicle at low vehicle speed is improved and sufficient air conditioning performance is effected in a higher vehicle speed range.

While the presently preferred embodiments of the present invention have been shown and described, it is to be understood that this disclosure is for the purpose of illustration and that various changes and modifications may be made without departing from the spirit and scope of the invention as set forth io the appended claims.

What is claimed is:

1. In a system for controlling a compressor of an air conditioner for a vehicle powered by an engine, the system having an electromagnetic clutch for coupling the engine with the compressor, an electrically operated switch provided in a circuit for engaging the clutch, vehicle speed detecting means for detecting vehicle speed and for producing a vehicle speed signal corresponding to the vehicle speed, and engine load detecting means for detecting pressure in an intake manifold of the engine and for producing an actual pressure signal corresponding to the actual pressure in the intake manifold, the improvement comprising:

reference load characteristic memorizing means memorizing a characteristic comprising a desired pressure signal representing a continuously decreasing function of decreasing of the vehicle speed signal, decision means for reading out a value of the desired pressure signal from the reference load characteristic memorizing means corresponding to and in response to the vehicle speed signal, comparator means for comparing the actual pressure signal with the read out value and for producing a clutch disengagement signal when the actual pressure signal is larger than the read out value; and control means responsive to the clutch disengagement signal for opening the electrically operated switch to stop operation of the compressor so as to reduce the load on the engine to increase the power for driving the vehicle.

2. The system according to claim 1, wherein said memorizing means sets said desired pressure signal, when the compressor is stopped, corresponding to an off-reference pressure of a higher load value than an on-reference pressure at the same vehicle speed when the compressor is on, so as to provide a hysteresis between on and off conditions of the compressor.

* * * * *